US012810190B2

(12) United States Patent
Bylinskii et al.

(10) Patent No.: US 12,810,190 B2
(45) Date of Patent: Nov. 24, 2026

(54) OPTICAL ADDRESSING METHODS AND APPARATUS

(71) Applicant: QuEra Computing Incorporated, Boston, MA (US)

(72) Inventors: Alexei Bylinskii, Boston, MA (US); Donggyu Kim, Boston, MA (US); Shengtao Wang, Arlington, MA (US); Ahmed Omran, Boston, MA (US); Nathan Gemelke, Boston, MA (US); Dirk Englund, New York, NY (US); Jesse Amato-Grill, Boston, MA (US); Alex Lukin, Boston, MA (US); Noel Wan, Boston, MA (US); Ming-Guang Hu, Boston, MA (US)

(73) Assignee: QuEra Computing Incorporated, Boston, MA (US)

( * ) Notice: Subject to any disclaimer, the term of this patent is extended or adjusted under 35 U.S.C. 154(b) by 293 days.

(21) Appl. No.: 18/560,747

(22) PCT Filed: May 17, 2022

(86) PCT No.: PCT/US2022/029554
§ 371 (c)(1),
(2) Date: Nov. 14, 2023

(87) PCT Pub. No.: WO2022/245769
PCT Pub. Date: Nov. 24, 2022

(65) Prior Publication Data

US 2024/0256938 A1 Aug. 1, 2024

Related U.S. Application Data

(60) Provisional application No. 63/189,825, filed on May 18, 2021.

(51) Int. Cl.
*G06N 10/40* (2022.01)
*H04B 10/70* (2013.01)

(52) U.S. Cl.
CPC ............. *G06N 10/40* (2022.01); *H04B 10/70* (2013.01)

(58) Field of Classification Search
CPC ................................ G06N 10/40; H04B 10/70
See application file for complete search history.

(56) References Cited

U.S. PATENT DOCUMENTS

2020/0023462 A1 1/2020 Amini et al.
2022/0197102 A1* 6/2022 Christen ................ G06N 10/40

FOREIGN PATENT DOCUMENTS

WO 2020018797 A1 1/2020
WO 2020236574 A1 11/2020

OTHER PUBLICATIONS

Third party observation for European application No. 22727716.7 dated Nov. 21, 2024.

(Continued)

*Primary Examiner* — Michael P Mooney
(74) *Attorney, Agent, or Firm* — Morgan, Lewis & Bockius LLP

(57) ABSTRACT

The present application discloses methods and apparatus for optically addressing qubits. An optical addressing system includes a source of electromagnetic radiation, at least one multi-frequency modulator configured to modulate electromagnetic radiation generated by the source of electromagnetic radiation to simultaneously produce at least two beams of electromagnetic radiation having different frequencies, each of which is configured to, when applied to multi-level quantum objects, at least partially drive one or more transitions between energy levels of the multi-level quantum objects, and a router configured to selectively direct the at (Continued)

least two beams of electromagnetic radiation to the multi-level quantum objects.

20 Claims, 16 Drawing Sheets

(56) References Cited

OTHER PUBLICATIONS

Rickert, Simultaneous and individual ion addressing for quantum information processing. Leopold-Franzens-Universitat Innsbruck, Master Thesis. Nov. 2018; 89 pages.
[No Author Listed], Wavelength Selective Switching in Optical Communications. Published on PowerPhotonic.com, Sep. 27, 2016;Document No. AN004:11 pages. URL: https://www.powerphotonic.com/wp-content/uploads/attachments/AN004%20Application%20Note%20Wavelength%20Selective%20Switches%20in%20telecommunications%20Powerphotonic.pdf.
Willits, Dynamic Line-by-line Pulse Shaping (Doctoral dissertation, University of Colorado at Boulder). 2012; 179 pages.
International Search Report and Written Opinion mailed Sep. 28, 2022 in connection with International Application No. PCT/US2022/029554.
International Preliminary Report on Patentability mailed Nov. 30, 2023 in connection with International Application No. PCT/US2022/029554.
Essig et al., Multiplexed photon number measurement. Physical Review X. Feb. 6, 2021;11(3):031045; 32 pages.
Lin et al., Advances in on-chip photonic devices based on lithium niobate on insulator. Photonics Research. Nov. 30, 2020;8(12):1910-36.
Wang et al., Incorporation of erbium ions into thin-film lithium niobate integrated photonics. Applied Physics Letters. Apr. 13, 2020;116(15), 5 pages.
Quera Computing Incorporated, EP20220727716, Third party observations for application No., Nov. 21, 2024, the whole document.
Julian Rickert: "Simultaneous and individual ion addressing for quantum information processing," Masters Thesis, Leopold-Franzens-Universitat Innsbruck, Nov. 2018, the whole document.

* cited by examiner

OPTICAL ADDRESSING METHODS AND APPARATUS

RELATED APPLICATIONS

This Application is a national stage filing under 35 U.S.C. § 371 of International Patent Application Serial No. PCT/US2022/029554, filed May 17, 2022, entitled "OPTICAL ADDRESSING METHODS AND APPARATUS", which claims priority to U.S. Application Ser. No. 63/189,825, filed May 18, 2021, entitled "OPTICAL ADDRESSING METHODS AND APPARATUS", each of which is herein incorporated by reference in its entirety.

BACKGROUND

Quantum computing platforms promise to provide solutions to many computationally intractable problems. In such computers, information is stored in quantum bits or "qubits," and the power of a quantum computer increases, in part, with the number of qubits that can be independently and simultaneously controlled. In quantum computers comprising qubits such as trapped ions or neutral atoms, optical beams implement independent qubit manipulations, while guided RF or microwave beams are typically used for implementing manipulations of qubits such as electron dots or superconducting rings.

In such quantum computers, each qubit control operation comprises a pulse of electromagnetic radiation with a certain frequency and intensity profile. Therefore, quantum computers generally include apparatus for generating such pulses selectively for each qubit. This apparatus typically comprises a single control tone generator, such as an oscillator or modulator, which controls each qubit by switching its output tone between different qubits, sacrificing simultaneous control, or an independent control tone generator for each qubit.

SUMMARY

Various embodiments disclosed herein relate to methods and apparatus for optically addressing qubits. In accordance with one or more embodiments, an optical addressing system includes a source of electromagnetic radiation, at least one multi-frequency modulator configured to modulate electromagnetic radiation generated by the source of electromagnetic radiation to simultaneously produce at least two beams of electromagnetic radiation having different frequencies, each of which is configured to, when applied to multi-level quantum objects, at least partially drive one or more transitions between energy levels of the multi-level quantum objects, and a router configured to selectively direct the at least two beams of electromagnetic radiation to the multi-level quantum objects. In some embodiments, the multi-level quantum objects can comprise neutral atoms, trapped ions, quantum dots, and superconducting rings. In certain embodiments, the at least one multi-frequency modulator can be further configured to produce beams of electromagnetic radiation having a spectral distribution of frequencies for each of the at least two beams, such that one beam has a first spectral distribution, another beam has a second spectral distribution, and the first and second spectral distributions are non-overlapping. In some embodiments, the optical addressing system can further include at least one single-frequency modulator configured to modulate electromagnetic radiation generated by the source of electromagnetic radiation to produce a beam of electromagnetic radiation having a frequency that fulfills a frequency resonance condition in combination with a single beam of the at least two beams produced by the at least one multi-frequency modulator, such that the combination drives the one or more transitions between energy levels of the multi-level quantum objects. In some of these embodiments, the beams of electromagnetic radiation produced by the multi-frequency and single-frequency modulators can be optical beams, the source of electromagnetic radiation can be an optical radiation source, and the router can further include a nonlinear optical medium that combines the optical beams. In certain embodiments, the nonlinear optical medium can be periodically-poled lithium niobate (PPLN). In some embodiments, the frequency resonance condition can be that the sum of the frequency of the beam of electromagnetic radiation produced by the single-frequency modulator and the frequency of the single beam of the at least two beams produced by the at least one multi-frequency modulator drives the transition, and the energy levels are a ground state energy level and an excited state energy level of the multi-level quantum objects. In some other embodiments, the frequency resonance condition can be that the difference between the frequency of the beam of electromagnetic radiation produced by the single-frequency modulator and the frequency of the single beam of the at least two beams produced by the at least one multi-frequency modulator drives the transition, and the energy levels are a hyperfine energy level and another hyperfine energy level of a ground state of the multi-level quantum objects.

In certain embodiments, the one or more transitions can be a k-photon transition, with k equal to or greater than 2. In some embodiments, the router can be further configured to selectively direct the beams of electromagnetic radiation produced by $N_m$ modulators into $N_m$-choose-k unique combinations, such that each multi-level quantum object $N_q$ receives k beams having frequencies that fulfill a frequency resonance condition for the transition between the energy levels of the multi-level quantum objects, each of the k beams being produced by a different modulator, and $$N_m \leq k \times N_q^{1/k}.$$

In some of these embodiments, the frequency resonance condition can be that the sum of the frequencies of the k beams drives the transition, and the energy levels are a ground state energy level and an excited state energy level of the multi-level quantum objects. In other embodiments, the frequency resonance condition can be that the difference between the frequencies of the k beams drives the transition, and the energy levels are a hyperfine energy level and another hyperfine energy level of a ground state of the multi-level quantum objects. In certain embodiments, the router can be further configured to selectively direct the beams of electromagnetic radiation produced by the $N_m$ modulators into $(N_m/k)^k$ unique combinations, and the multi-level quantum objects can be arranged on a k-dimensional grid. In some other embodiments, $N_q$ multi-level quantum objects can be arranged on a D dimensional grid, the router can be further configured to selectively direct $$N_q^{(k-1)/D}$$

selectable beams of electromagnetic radiation produced by the at least one multi-frequency modulator to the $N_q$ multi-level quantum objects, and the system further includes $$\lceil N_q^{1/d} \times (k-1) \rceil$$

single-frequency modulators that each produces a beam of electromagnetic radiation having a distinct frequency that fulfills a frequency resonance condition in combination with a single beam of the at least two beams produced by the at least one multi-frequency modulator.

In some embodiments, the router can be further configured to combine the beams in free space. In some other embodiments, the beams of electromagnetic radiation can be combined at the multi-level quantum objects. In certain embodiments, the router can include at least one waveguide arranged to combine the at least two beams of electromagnetic radiation. In some embodiments, the router can include at least one photonic integrated circuit (PIC) arranged to combine the at least two beams of electromagnetic radiation. In certain embodiments, the router can include a holographic addressing system. In some of these embodiments, the holographic addressing system can be a spatial light modulator (SLM). In other embodiments, the holographic addressing system can be a phase plate.

In certain embodiments, the router can further include a frequency division demultiplexer (demux) arranged to separate the at least two beams of electromagnetic radiation. In some embodiments, the at least two beams of electromagnetic radiation produced by the at least one multi-frequency modulator can be optical beams, the source of electromagnetic radiation can be an optical radiation source, and the demux can be an optical demux.

In some embodiments, the optical radiation source can be a laser or a superluminescent diode. In certain embodiments, the optical radiation source and the at least one multi-frequency modulator can be integrated into a multi-frequency optical radiation source. In some embodiments, the at least one multi-frequency modulator can be an electro-optic modulator, acousto-optic modulator, micro-electro-mechanical (MEMs) modulator, or a variable gain amplifier. In certain embodiments, the optical demux can be at least one dispersive optical element. In some of these embodiments, the at least one dispersive optical element can be at least one optical grating, such as at least one reflective grating, or a volume Bragg grating. In some other embodiments, the at least one dispersive optical element can be at least two dispersive optical elements, such as at least two etalons. In certain embodiments, the optical demux can be at least one dispersive fiber-optic element, such as at least one fiber Bragg grating. In some embodiments, the optical demux can be a photonic integrated circuit (PIC). In some of these embodiments, the PIC can include a tree of unbalanced Mach-Zehnder interferometers, or an array of micro-ring resonators. In certain embodiments, the router can further include at least one optical waveguide, such as at least one fiber, or at least one optical integrated structure. In some embodiments, the router can further include a beam shaping device, such as a spatial light modulator (SLM), a phase plate, or an array of phase plates. In certain embodiments, the at least two beams of electromagnetic radiation produced by the at least one multi-frequency modulator can be RF or microwave beams, the source of electromagnetic radiation can be an oscillator or digital synthesizer, and the demux can be an electronic demux. In some of these embodiments, the router can further include at least one RF or microwave waveguide configured to direct the at least two beams of RF or microwave electromagnetic radiation to the multi-level quantum objects. In certain embodiments, the at least one RF or microwave waveguide can be a coaxial cable or a stripline. In some embodiments, the electronic demux can be an assembly of electronic filters, electronic mixers, or electronic switches.

An optical addressing system that includes a number of modulators that is smaller than the number of qubits has many advantages, such as reducing the complexity and cost of commercially useful quantum computing platforms.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
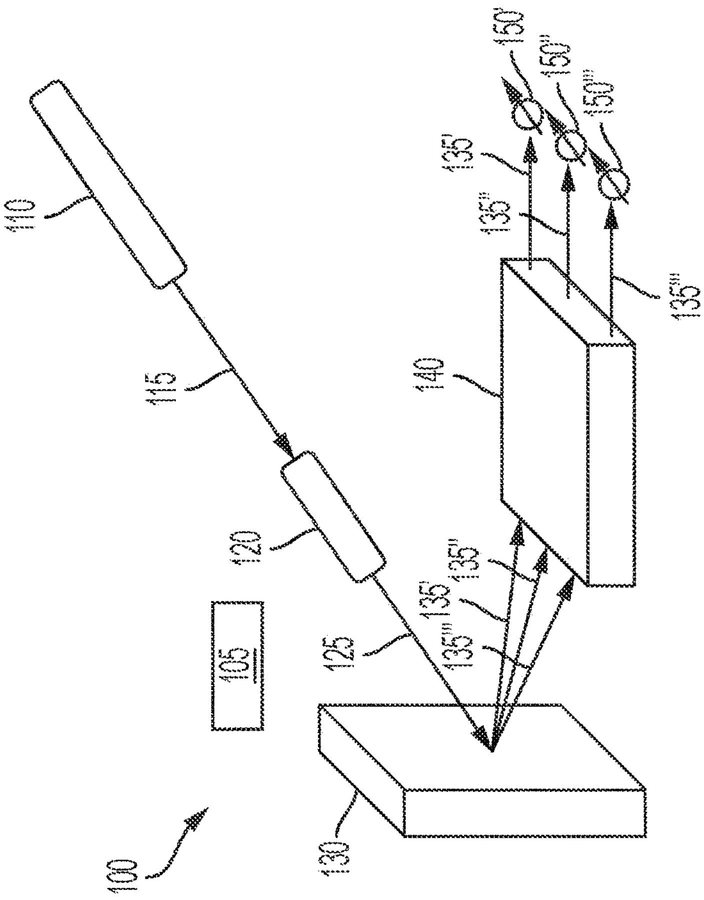
FIG. 1A schematically illustrates a spectrometric addressing optical addressing system in accordance with one or more embodiments.

As discussed above, some quantum computers control qubits using pulses of electromagnetic radiation generated by a control tone generator for each qubit. However, the complexity and cost of integrating a large number of such control tone generators presents a formidable challenge to scaling up quantum computing platforms to commercially useful sizes with a large number (e.g., 100 or more) of qubits.

Therefore, it would be desirable for an optical addressing system to include a number of control tone generators that is smaller than the number of qubits. The inventors have recognized and appreciated techniques suitable for controlling a large number of qubits (e.g., 100 or more) with a number of modulators that is smaller than the number of qubits. The techniques may reduce the amount of hardware needed to control a large number of qubits with reduced crosstalk between qubits, thereby leading to a system that is more practically scalable as the number of qubits increases.

Described herein are arrangements of active control channels, also referred to herein as modulators, and passive devices, also referred to herein as routers, which provide control over many qubits independently and simultaneously, using a number of active control channels that is smaller than the number of qubits. In various embodiments, qubits can comprise multi-level quantum states, a subset of which are used to store information. Control of a qubit involves driving transitions between qubit states. The control channels include modulated electromagnetic radiation sources, such as oscillators or lasers whose frequency and power can be modulated, or devices that can modulate electromagnetic radiation generated elsewhere, such as voltage-controlled amplifiers, phase shifters, or electro-optic or acousto-optic modulators. Routing this electromagnetic radiation may comprise propagating the radiation through a waveguide, such as a coaxial cable, stripline, optical fiber, or integrated waveguide, or propagating the radiation in a distinct spatial mode through free space, such as a Gaussian beam, in a frequency-dependent distribution that depends on the modulator. Two types of implementations of modulators and routers are described herein, as well as combinations of modulators and routers. In both types of implementations, at least one multi-frequency modulator produces beams of electromagnetic radiation having different frequencies, also referred to herein as "control tones" or simply "tones," as described further below, that control distinct qubits. These tones may then be routed selectively to qubits, and/or these tones may be combined with the outputs of other modulators in such a way as to selectively generate desired qubit responses.

The first type of implementation, collectively referred to herein as the spectrometric addressing implementation, employs at least one multi-frequency modulator coupled to a type of router called a frequency-division demultiplexer ("demux"). The bandwidth of the modulator, $B_m$, is larger than the bandwidth $B_q$ needed to control each qubit, so that the bandwidth of the modulator can be divided up amongst multiple qubits. The control tones intended for each qubit, differing in frequency by the spectral resolution of the demux, are routed by the demux to independent waveguides or into independent spatial modes (also referred to herein as beams), and thereby to the qubits. This type of implementation produces a multiplicative advantage of $B_m/B_q$ in the number of qubits that each modulator can control.

The second type of implementation, collectively referred to herein as the active-matrix implementation, takes advantage of the nonlinear response of qubits to differing frequencies of electromagnetic radiation. For some multi-level quantum objects, transitions between qubit states can be driven by multiple photons, if and only if the sums or differences in the energy of the multiple photons are approximately equal to the energy difference between the qubit states. Active-matrix implementations employ a set of multi- and single-frequency modulators whose outputs are arranged so that each qubit receives only the control tones generated by a unique subset of the modulators. These implementations scale super-linearly in the number of qubits, that is, the number of qubits that can be controlled by N modulators is proportional to $N^k$, where k is an integer greater than one (e.g., k=2, or 3) that corresponds to the number of photons involved in the transition between qubit levels (e.g., two-photon, or three-photon transitions).

In some embodiments, the two types of implementations can also be combined, thereby benefiting from the advantages of spectrometric addressing devices in reducing the total number of control channels/modulators and in reducing crosstalk between qubits, and the advantages of active-matrix devices in super-linear scaling of the number of controllable qubits.

Spectrometric Addressing Implementations

Figure 1B:
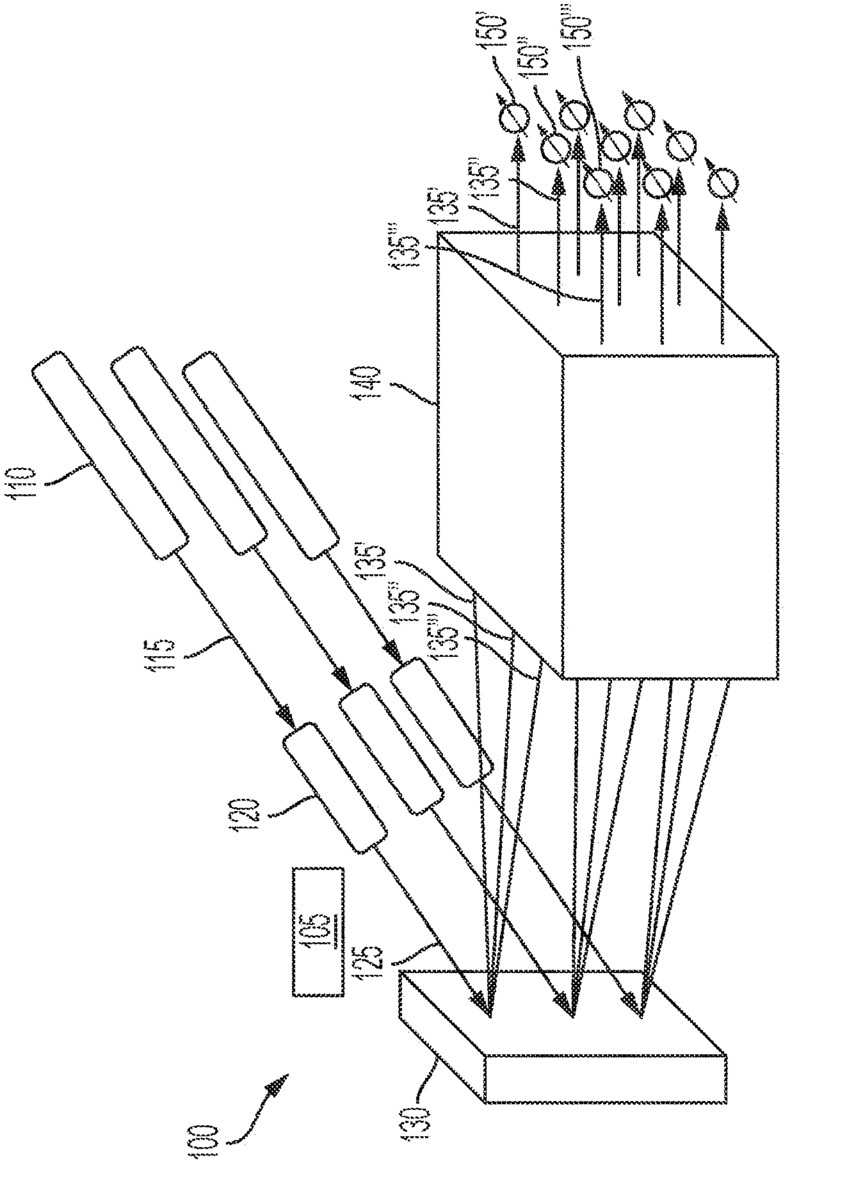
FIG. 1B schematically illustrates another spectrometric addressing optical addressing system in accordance with one or more embodiments.
Figure 1C:
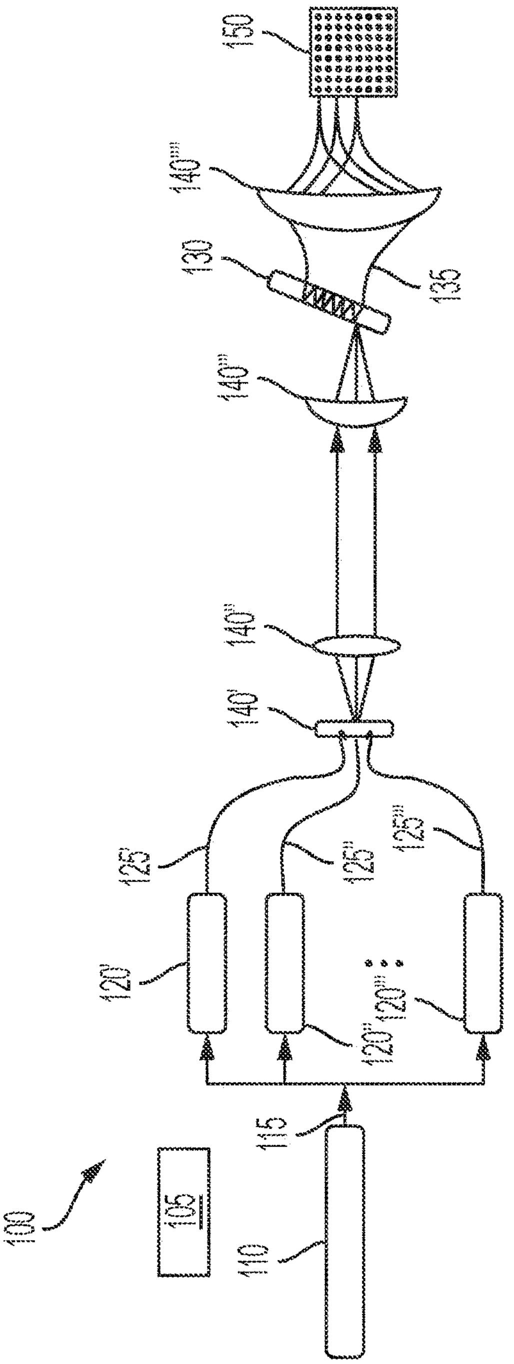
FIG. 1C schematically illustrates yet another spectrometric addressing optical addressing system in accordance with one or more embodiments.

In accordance with one or more embodiments, as shown in FIGS. 1A-1C, a spectrometric optical addressing system 100 includes a source 110 of electromagnetic radiation 115. The example of FIG. 1A depicts a system suitable for one-dimensional qubit addressing, whereas the examples of FIGS. 1B-1C depict systems suitable for two-dimensional qubit addressing. The same components may be utilized in each system, however, and the below description of the components may apply to any embodiment or embodiments of the systems described herein.

Each of the systems of FIGS. 1A-1C include one or more electromagnetic radiation sources 110. Examples of suitable electromagnetic radiation sources 110 include an oscillator, a laser, an incoherent source such as a superluminescent diode, or other sources as described further below. Each optical addressing system 100 further includes one or more multi-frequency modulators 120 that are each configured to modulate, as directed by controller 105, a beam 115 generated by a radiation source 110, thereby generating a plurality of electromagnetic radiation beams 125 with multiple frequencies. Examples of suitable multi-frequency modulators 120 include a voltage-variable-amplifier, such as a variable gain amplifier, a voltage-variable-phase shifter, a micro-electro-mechanical (MEMs) modulator, or an electro-optic or acousto-optic modulator that directly modulates the radiation.

In the examples of FIGS. 1A-1B, a multi-frequency modulator 120 having a bandwidth $B_m$ modulates an incident laser beam 115 having a frequency $\nu$ at, for example, the modulation frequencies $\nu_1$, $\nu_2$, and vs that are within the modulation bandwidth $B_m$ (i.e., $\nu_1$, $\nu_2$, and $\nu_3<B_m$). The modulation frequencies $\nu_1$, $\nu_2$, and $\nu_3$ are also referred to herein as RF tones, as they are typically in the RF frequency range (20 kHz-300 GHz). As a result, the modulator 120 may produce three beams of electromagnetic radiation 125 having different frequencies $\nu+\nu_1$, $\nu+\nu_2$, and $\nu+\nu_3$. These beams may also be referred to herein as control tones. In at least some cases, the frequencies of the modulated electromagnetic radiation components 125 may be much higher than the RF frequency range. In some embodiments, a radiation source 110 and a multi-frequency modulator 120 may be supplied as an integrated multi-frequency radiation source. The frequency $\nu$ of the electromagnetic radiation depends on the specific control scheme for a particular multi-level qubit system, and therefore, in some embodiments, the frequency $\nu$ can be in the UV-visible-infrared frequency range (e.g., in a range of between about 300 nm and about 1.5 μm), or, in other embodiments, the frequency $\nu$ can be in the microwave frequency range.

A variety of different types of router are suitable for the optical addressing system 100. In the embodiments shown in FIGS. 1A-1B, the router 130 is a frequency-division demultiplexer ("demux") 130, such as an optical demux 130, arranged to separate the beams of electromagnetic radiation 125. The optical demux 130 shown in FIGS. 1A-1B is a dispersive optical element 130, such as an optical grating 130 (e.g., a reflective grating) that spatially separates the different control tones of electromagnetic radiation beams 125 into different spatial or guided modes 135, three such modes 135' ($\nu+\nu_1$), 135" ($\nu+\nu_2$), and 135" ($\nu+\nu_3$) shown in FIG. 1A. A variety of different types of dispersive elements is suitable for the dispersive element 130, such as a virtually imaged phase array (VIPA), a diffraction grating, an arrayed waveguide grating, a dispersive fiberoptic element, such as a fiber Bragg grating, or a volume Bragg grating.

The router 130 includes optical component or components 140 that subsequently direct or otherwise deliver the one or more spectrally separated beams 135 of electromagnetic radiation to the target qubits 150 for individual addressing. The component(s) 140 may include any suitable free-space optics and/or waveguides. In the example of FIG. 1A, three qubits 150', 150", and 150" are shown being addressed by beams 135', 135", and 135", respectively. For a more formal description, consider the case where the optical modulator 120 is driven by three RF tones $V_1 \cos(\nu_1 t+\phi_1)$, $V_2 \cos(\nu_2 t+\phi_2)$, and $V_3 \cos(\nu_3 t+\phi_3)$ to modulate the amplitude of the incident laser beam 115. Then, the modulated laser field E(t) 125 is proportional to $$E(t) \propto \left[\pi\frac{V_1}{V_\pi}\cos(\nu_1 t+\phi_1)+\pi\frac{V_2}{V_\pi}\cos(\nu_2 t+\phi_2)+\pi\frac{V_3}{V_\pi}\cos(\nu_3 t+\phi_3)\right], \quad (1)$$

which is split into three laser beams 135, $$E_1(t)=\pi\frac{V_1}{V_\pi}\exp[i(\nu_1 t+\phi_1)],\ E_2(t)=\pi\frac{V_2}{V_\pi}\exp[i(\nu_2 t+\phi_2)],$$

$$\text{and } E_3(t)=\pi\frac{V_3}{V_\pi}\exp[i(\nu_3 t+\phi_3)].$$

The amplitude V and phase $\phi$ of the addressing laser beams 135', 135", and 135", ($V_1$, $\phi_1$), ($V_2$, $\phi_2$), and ($V_3$, $\phi_3$), respectively, are independently adjusted, enabling individual local qubit control.

The spectrometric addressing implementation can be extended to two-dimensional qubit addressing, as shown in FIG. 1B, where only one row is labeled for clarity. With multiple modulated beams 125 incident onto the dispersive element 130 with the positions shifted (i.e., tilted) along the second dimension (i.e., vertical or y-axis), a two-dimensional array of beams 135, whose amplitude and phase are independently controllable, addresses a two-dimensional array of qubits 150.

In yet another embodiment, the spectrometric addressing implementation can be extended to two-dimensional qubit addressing by using a virtually imaged phase array (VIPA), as shown in FIG. 1C, where only three fiber electro-optic (EO) modulators 120 are labeled for clarity among a group of eight fiber EOs in this example. Multi-frequency modulators 120 are each configured to modulate a beam 115 having a frequency $\nu$ generated by a radiation source 110 at frequencies $\nu_1$-8, thereby generating eight electromagnetic radiation beams 125 with eight different frequencies [($\nu+\nu_1$), ($\nu+\nu_2$), ($\nu+\nu_3$), ($\nu+\nu_4$), ($\nu+\nu_5$), ($\nu+\nu_6$), ($\nu+\nu_7$), and ($\nu+\nu_8$)]. The router 130 includes optical components 140 that direct the 1×8 fiber array 140' through lenses 140" and 140" to the VIPA 130 that separates the beams of electromagnetic radiation 125 into different spatial modes 135 that are focused by another cylindrical lens 140"" and address a two-dimensional (8×8) array of qubits 150.

Figure 2B:
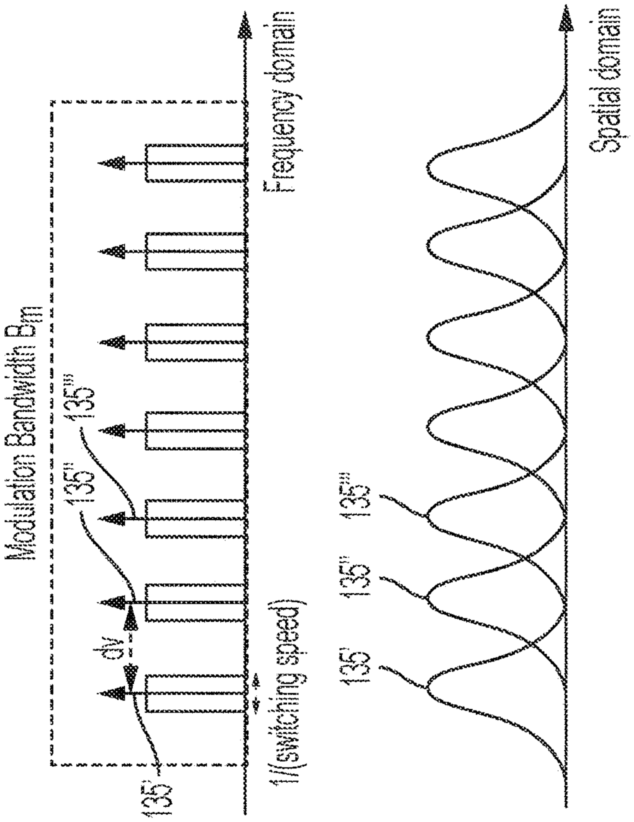
FIG. 2B illustrates overlapping control tones in the frequency domain (upper) and the spatial domain (lower) in accordance with one or more embodiments.
Figure 2A:
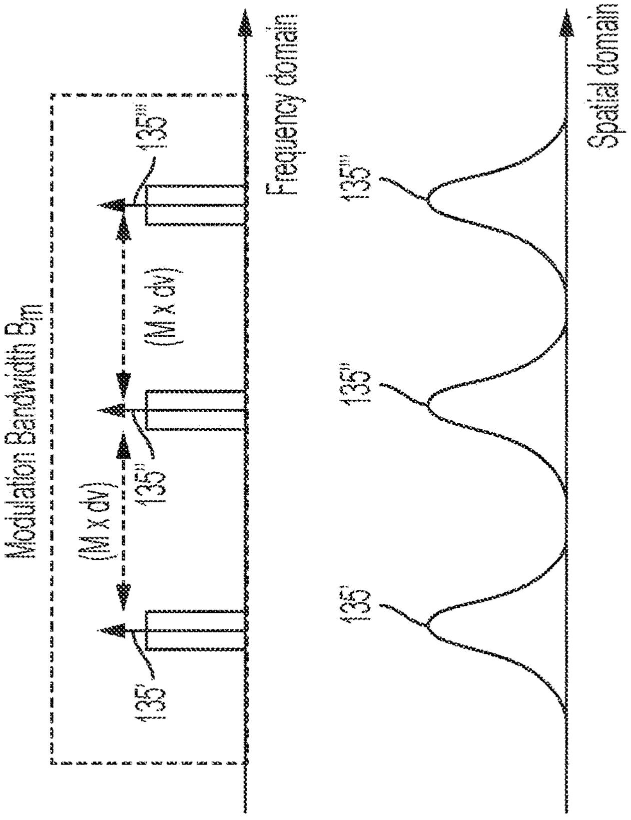
FIG. 2A illustrates non-overlapping control tones in the frequency domain (upper) and the spatial domain (lower) in accordance with one or more embodiments.

The number of active control channels 135 that a modulator 120 can produce is ultimately limited by the ratio $B_m/B_q$ of the total bandwidth of the modulator $B_m$ to the minimum modulator bandwidth required per qubit $B_q$. In some embodiments, the multi-frequency modulator 120 is configured to produce beams 135 of electromagnetic radiation having a spectral distribution of frequencies for each of the beams 135 such that one beam 135' has a first spectral distribution, another beam 135" has a second spectral distribution, and the first and second spectral distributions are non-overlapping. However, in practice, the resolving power of the router 130 reduces the maximum number of channels due to overlap of the spatial modes at the positions of the qubits, or at the input to a fiber array. As illustrated in FIG. 2A, in some embodiments the spatial modes 135', 135", and 135" are separated far enough apart so that their overlap is negligible (i.e., non-overlapping), whereas the spatial modes 135 start to overlap, as shown in FIG. 2B (where only three spatial modes 135', 135", and 135" are labeled for clarity), before the switching speed limit of a modulator 120 (not shown) is reached. Therefore, dispersive elements with high resolving power are preferred for the router 130 described herein.

Figure 3:
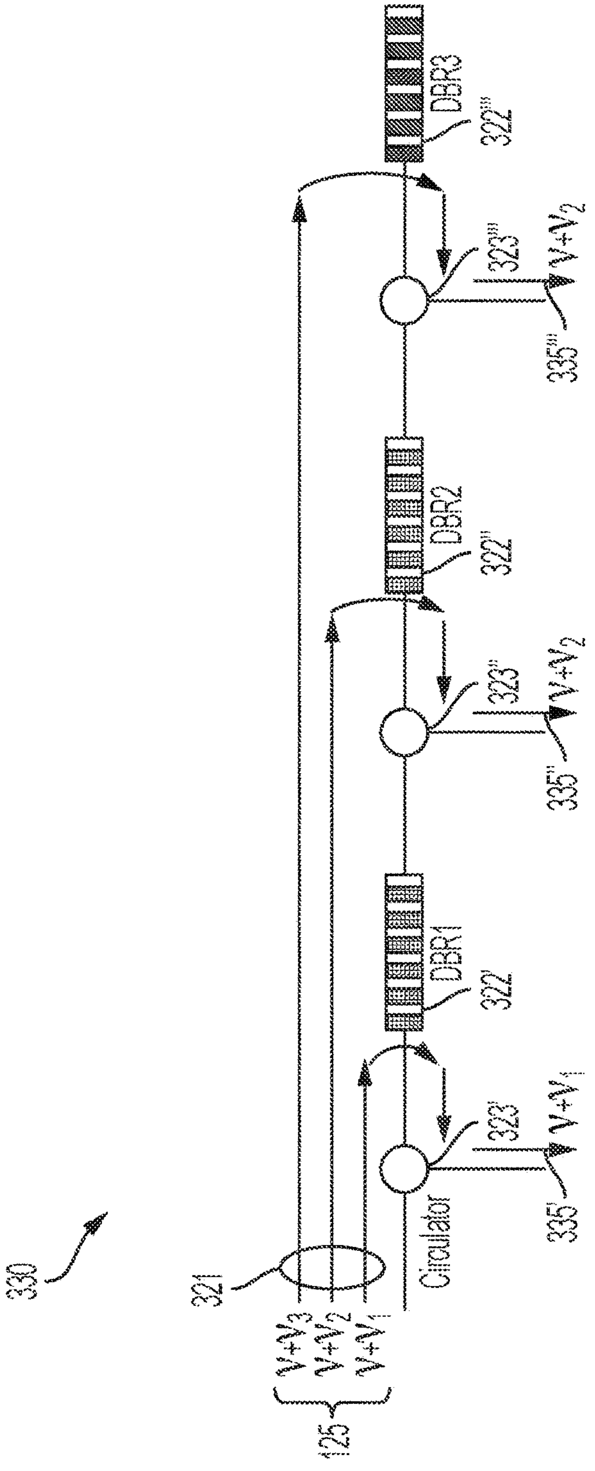
FIG. 3 schematically illustrates a router including fiber Bragg gratings in accordance with one or more embodiments.

In some embodiments, the router can comprise at least two dispersive optical elements, such as several narrow-band frequency filters. Examples of suitable filters include fiber Bragg gratings, volume Bragg gratings, arrayed waveguide gratings, optical cavities (e.g., etalons), micro-ring resonators, or arrays of unbalanced Mach-Zehnder interferometers. In one embodiment shown in FIG. 3, a router 330 includes fiber Bragg gratings 322. Multiple tones 125 from a modulator 120 (not shown) are coupled into an optical fiber 321, each tone 125 resonantly reflecting off a corresponding fiber Bragg grating 322', 322", or 322", with the resonant frequency beam 335', 335", or 335" coupled out using a corresponding optical circulator 323', 323", or 323".

Figure 4:
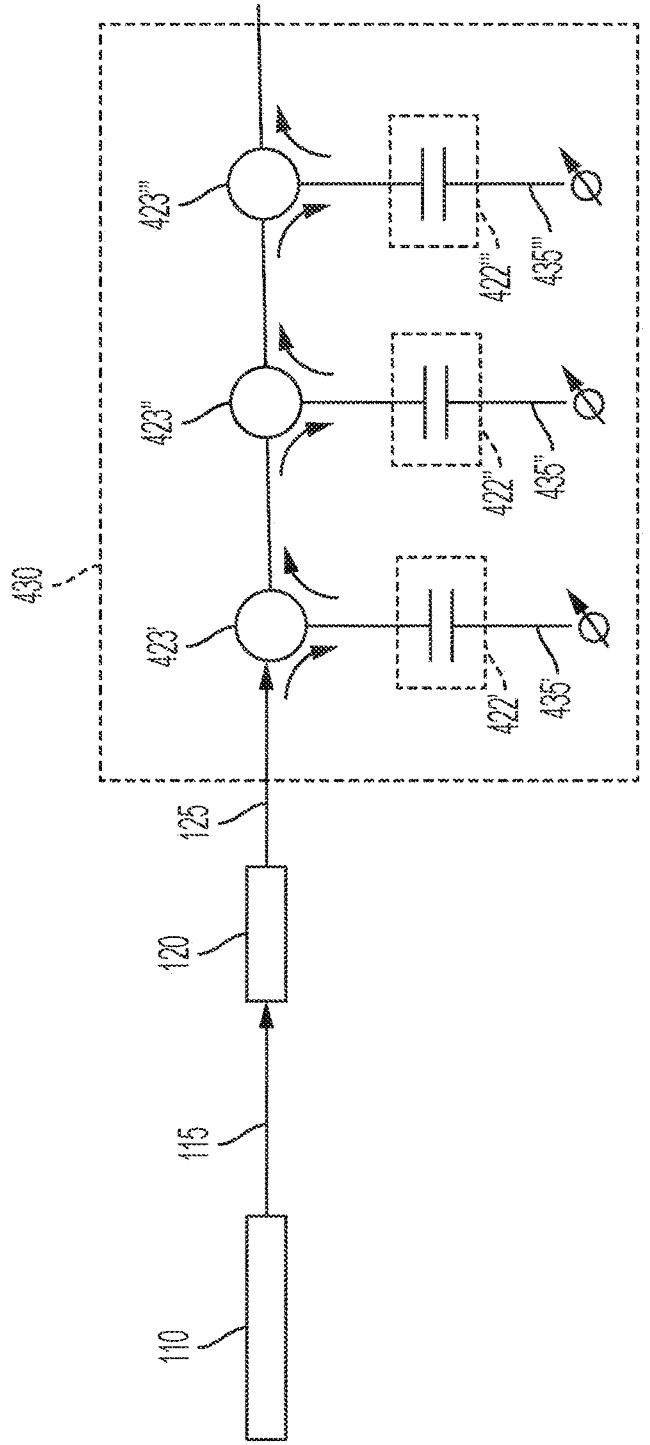
FIG. 4 schematically illustrates an optical addressing system including etalons in accordance with one or more embodiments.
Figure 5:
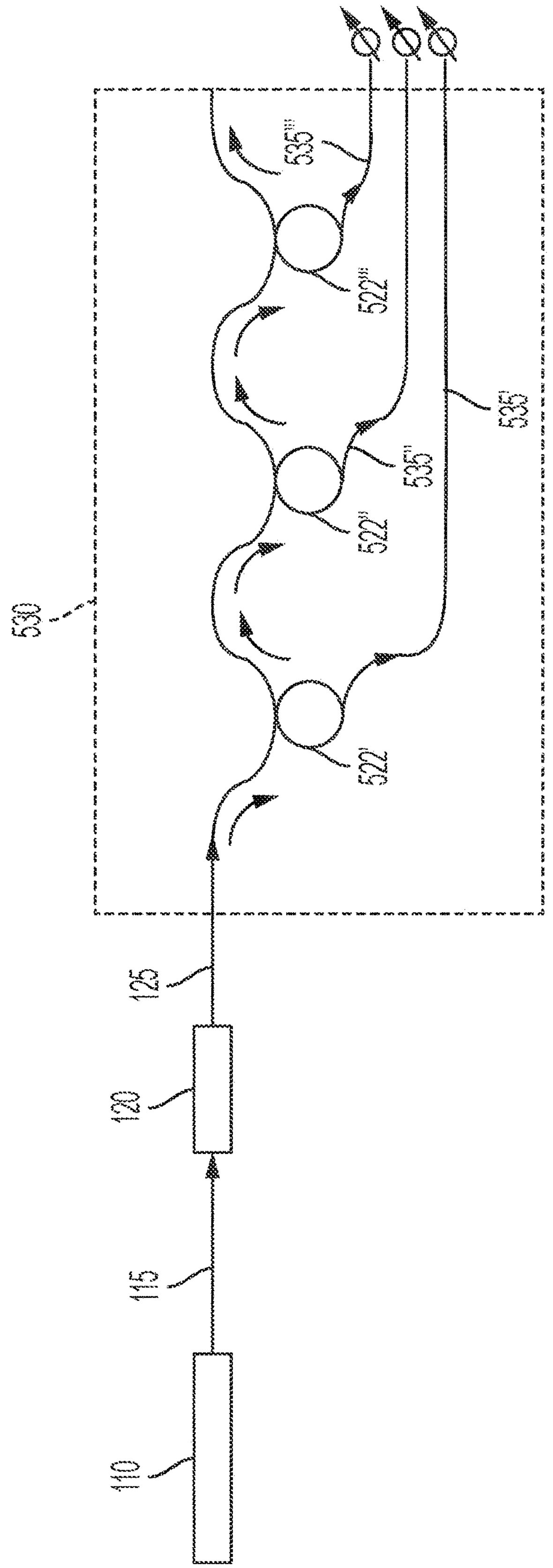
FIG. 5 schematically illustrates an optical addressing system including micro-ring resonators in accordance with one or more embodiments.

In another embodiment, shown in FIG. 4, a router 430 comprises several narrow-band optical cavities (e.g., etalons) 422. The modulated light 125 is reflected off an array of etalons, three etalons 422', 422", and 422" shown in FIG. 4, each one of which passes through an individual spectral tone 435', 435", or 435", and reflects the other frequency components. In this embodiment, the number of control channels, crosstalk, and switching speed are interrelated. Enhanced performance can be achieved by using multiple identical etalons in series (not shown) to filter an individual spectral tone 435. Alternatively, in the embodiment shown in FIG. 5 using a photonic integrated circuit (PIC), a router 530 comprises several micro-ring resonators 522, three micro-ring resonators 522', 522", and 522"" shown in FIG. 5, in place of free-space etalons that filter out individual control tones 535', 535", or 535" from the common beam 125.

Figure 6:
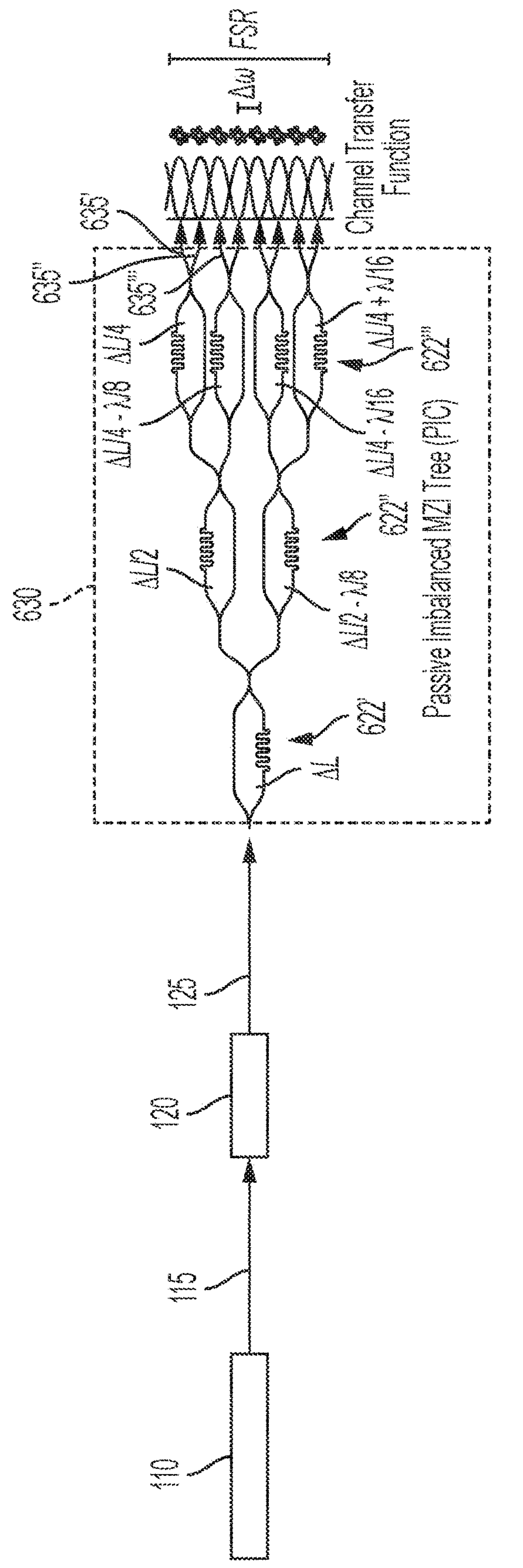
FIG. 6 schematically illustrates an optical addressing system including Mach-Zehnder interferometers in accordance with one or more embodiments.

In yet another embodiment using a photonic integrated circuit (PIC) shown in FIG. 6, a router 630 comprises an array of unbalanced Mach-Zehnder interferometers that filter out individual control tones. In this embodiment, two arms of the interferometer have a precisely designed path-length difference ΔL, such that at every layer of interferometers 622', 622", and 622'" a subset of frequency components is demultiplexed. As an example, a grid of evenly spaced control tones 635', 635", and 635'" etc., is obtained by cascading multiple layers of interferometers such that the path-length difference ΔL is halved with each layer and the center frequency of the interferometer filter function is shifted to select frequency components. In another embodiment, the PIC can also implement a frequency filter based on light dispersion through an arrayed waveguide grating (AWG). The AWG consists of an input waveguide containing radiation at multiple frequencies that is then diffracted and passed through a waveguide array. Different frequencies of radiation accumulate different phases in the waveguide array and are thus steered into different output waveguides. In yet another embodiment in a PIC, an echelle grating is produced in the PIC using a combination of in-plane diffraction and a reflective interface in the PIC. For example, a single input waveguide can direct multiple radiation frequencies at a blazed grating etched into the PIC that disperses individual frequencies into distinct output waveguides.

Active-Matrix Implementations

Active-matrix implementations utilize a combinatorial approach to increasing the number of qubits addressable by a given number of modulators. Simultaneity and specificity of the addressing is achieved by ensuring that each qubit receives at least one unique combination of tones that fulfills a resonance condition, and that at least one of the tones in this unique combination comes from a different modulator than the other tones.

An electromagnetic transition between two quantum states in a quantum m-level system can only be driven resonantly when the sums or differences of the energies of the incident photon fields achieve a certain resonance condition. For example, a transition can be driven by a single photon if the photon energy is equal to the energy difference ΔE between the quantum states. A two-photon transition can be driven resonantly if the energies of the two photons sum to ΔE, or if the difference between photon energies is equal to ΔE. A three-photon transition can be resonantly driven if the sum of the three photon energies equals ΔE, or the sum of two photon energies minus the other photon energy equals ΔE, and so on. When a quantum system is driven by photons whose energies do not achieve the resonance condition, the transition is said to be driven off-resonantly, and when the photons are sufficiently off-resonant, the change they make in the original quantum state is small. When the energy levels involved belong to a qubit, off-resonant driving can produce gate errors. In some embodiments, the energy levels are a ground state energy level and an excited state energy level of the qubits. In other embodiments, the energy levels are a hyperfine energy level and another hyperfine energy level of a ground state of the qubits.

Multi-photon transitions can be driven between two quantum states in isolation, or via intermediate states of the same qubit. In general, the presence of intermediate states greatly increases the rate at which the transitions can be driven. For example, in the case of two-photon transition between two states via a single intermediate state from which both photons are equally off-resonant, the aggregate Rabi frequency can be expressed as $\Omega_1\Omega_2/\Delta$, where $\Omega_1$ and $\Omega_2$ are the resonant driving Rabi frequencies from each state to the intermediate state, and Δ is their common detuning from the intermediate state (provided that Δ is much larger than any loss rate from the intermediate state). Equivalent expressions can be formulated for multi-photon transitions for larger numbers of photons. Note that the value of Δ can be freely chosen (while necessarily varying the two-photon Rabi frequency), such that there exist many possible combinations of photon frequencies that resonantly drive the two-photon transition.

Figure 7A:
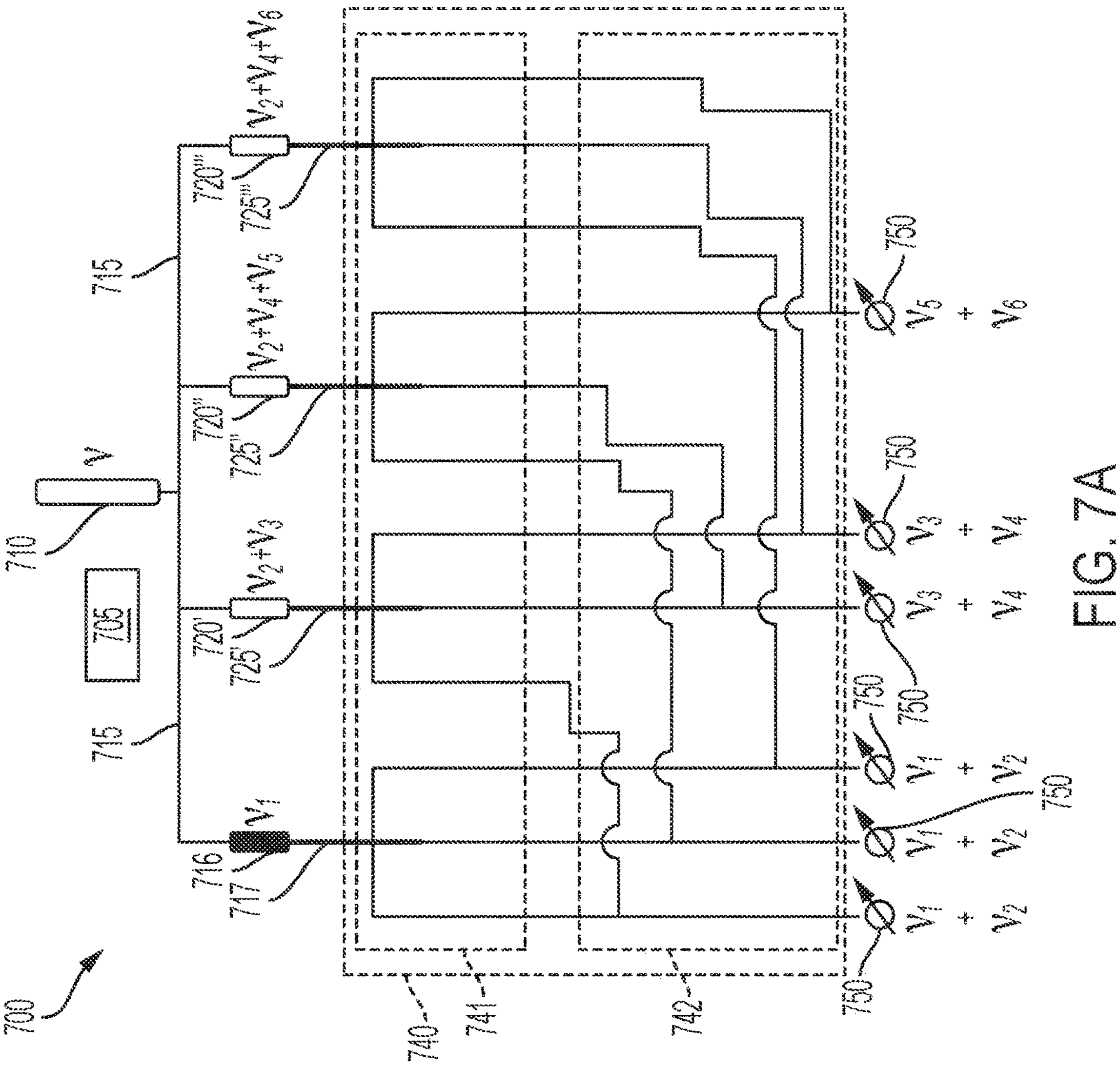
FIG. 7A schematically illustrates an active-matrix optical addressing system in accordance with one or more embodiments.

In accordance with one or more embodiments, as shown in FIG. 7A, an active-matrix optical addressing system 700 includes one or more electromagnetic radiation sources 710. Examples of suitable electromagnetic sources 710 include an electronic oscillator, a laser, master-slave-type laser and amplifier systems, or incoherent sources such as superluminescent diodes. The source 710 may or may not be locked to an external reference frequency source through an injection-locking subsystem or other frequency-locking technique. The source 710 may operate with continuous wave (CW) power, or as a pulsed oscillator. The optical addressing system 700 further includes one or more multi-frequency modulators 720 that are each configured to modulate a beam 715 of electromagnetic radiation generated by the radiation source 710, thereby generating a plurality of electromagnetic radiation beams 725 with multiple frequencies (725', 725", and 725" shown in FIG. 7A). Examples of suitable multi-frequency modulators 720 include electrically driven optical-frequency modulators based on electro-optic (e.g., Pockels, Kerr, or electrogyration mechanisms), acousto-optic, stress-optic, optoelectronic semiconductor effects (e.g., plasma dispersion effects, quantum-confined Stark or Franz-Keldysh effects, or other optical gain or loss modulations), or electron-induced-permittivity-modification, in guided or unguided (bulk) optical geometries, or electrically-driven microwave radiation modulators based on varactor- or other diodes, MOSFET-, JFET-, and bipolar transistor-based devices such as mixers, parametric-amplifiers, non-linear transmission-lines, or variable-gain amplifiers. Alternatively, the modulators can be constructed from non-linear optics or microwave electronics, wherein modulation imprinted on one frequency using modulators described above is then transferred to the radiation of interest using a non-linear medium, such as non-linear optical materials (e.g., lithium niobate, potassium niobate, KTP, SiN, or BBO), optical gain media in such a pumping effect acts as a nonlinearity or, in the microwave frequency range, using discrete devices such as varactor- or other diodes, MOSFET-, JFET- and bipolar transistors singly or as a plurality acting as an effective medium, or other non-linear metamaterials. The modulators can be configured to modulate the beam 715 amplitude, and/or phase, and/or polarization, and/or a plurality of guided-wave modal states. The modulators 720 can be constructed in any one of various topologies, including single-pass through a modulating structure, or through more complex structures, such as interferometers (e.g., Mach-Zehnder, Sagnac, Michelson, or Fizeau), coupled to resonators with modulation internal or external to the resonator, or be placed in so-called "critical-coupling" regimes. The addressing system 700 further includes one or more single-frequency modulators 716 that are similar to the multi-frequency modulators described above, but are each configured to modulate the beam 715 of electromagnetic radiation generated by the radiation source 710 to generate an electromagnetic radiation beam 717 with a desired single frequency. Alternatively, the optical addressing system 700 can further include one or more additional electromagnetic radiation sources to generate electromagnetic radiation beams with desired single frequencies (not shown). The optical addressing system 700 further includes a router 740 configured to selectively direct the beams of electromagnetic radiation to the qubits 750. The router 740 includes a power splitter 741 configured with, for example, fiber splitters 741, and a power combiner 742 configured with, for example, fiber combiners 742 that direct the beams of electromagnetic radiation to the qubits 750 as shown in FIG. 7A. Additional embodiments of the router 740 components 741 and 742 are described further below. Any combination of the elements 710, 720, 740, 741, and 742 can optionally be integrated into a monolithic assembly using integrated photonics platforms (for example, using silicon photonics, indium phosphide photonics, silicon-nitride photonics, lithium niobate integrated photonics, aluminum oxide photonics, aluminum nitride photonics, or PLZT materials, or their hybrid combinations), integrated microwave electronics techniques (for example, using semiconductors, microstrip, stripline, or printed-circuit-board techniques), or be constructed from individual elements in a non-integrated manner. Alternatively, the functionality of the radiation source 710 and modulator 720 can optionally be combined in a single element, such as a current-modulated laser-diode or parametric oscillator driven by a modulated pump source. Alternatively, the "open-loop" structure described above can be operated in a "closed-loop" in which some portion of the energy of one or more of the output radiation modes 725 or one or more radiation modes from the router 740 is redirected as full or partial input referencing or replacing the source 710.

N-Choose-k Implementation

Given a transition driven by k different frequency photons where k is an integer equal to or greater than 2, it is possible to create combinations of the outputs of N modulators such that more than N qubits can be simultaneously and independently controlled. While many qubits may be exposed to radiation from a certain modulator, no single modulator provides the photons at all k relevant frequencies for driving a particular transition, so that tones from at least two modulators are required. Different modulators can provide the same combinations of tones, and these tones can be individually switched on and off. Therefore, the maximum number of qubits $N_q$ addressable by $N_m$ modulators on a k-photon transition scales as the binomial coefficient N-choose-k, with $$N_m \leq k \times N_q^{1/k}.$$

Figure 7B:
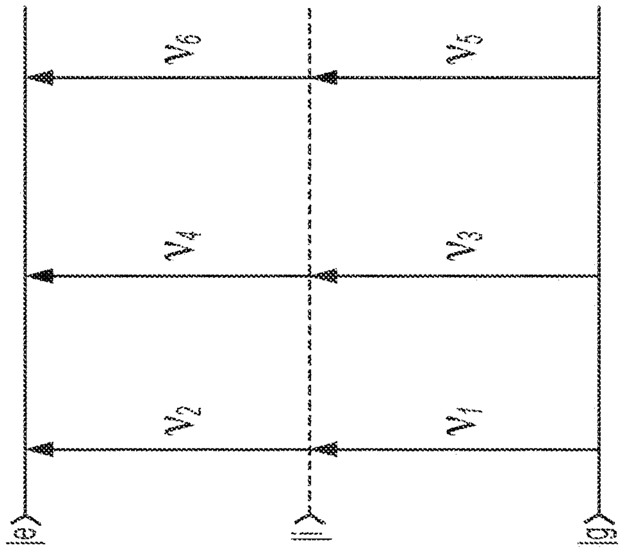
FIG. 7B schematically illustrates a two-photon level diagram in accordance with one or more embodiments.

For example, consider qubits driven by a two-photon (i.e., k=2) transition from $|g\rangle$ to $|e\rangle$ by way of an optional intermediate state $|i\rangle$, as shown in FIG. 7B. All the distinct two-modulator combinations shown in FIG. 7A can drive resonant two-photo transitions in different qubits, simultaneously and independently. A suitable but not limiting prescription for choosing the appropriate frequency tones is as follows: let the single-frequency modulator 716 produce a frequency $\nu_1$. Let each of the remaining N−1 multi-frequency modulators 720 produce a frequency $\nu_2$, such that $\nu_1+\nu_2=\nu_{res}$, where $\nu_{res}$ is the resonant frequency for the transition. Let the outputs of these modulators 716 and 720 be combined into unique N−1 combinations of the first modulator and the remaining N−1 modulators as shown in FIG. 7A. By switching the modulators 720 producing the tones at $\nu_2$ on and off using the controller 705, control of N−1 qubits can be achieved. Now let the multi-frequency modulator 720' also produce a tone $\nu_3$ such that neither $\nu_1+\nu_3$ nor $\nu_2+\nu_3$ fulfills the resonance condition, and let the remaining N−2 multi-frequency modulators 720 produce a tone $\nu_4$ such that $\nu_3+\nu_4=\nu_{res}$, but neither $\nu_1+\nu_4$ nor $\nu_2+\nu_4$ fulfills the resonance condition. Let the outputs be combined into the unique combinations of the modulator 720' and the remaining N−2 multi-frequency modulators 720" and 720" shown in FIG. 7A. This process is repeated until all the modulators have been used, as illustrated for the case of $N_m$=4 in FIG. 7A. Thus, the number of addressable qubits is (N−1)! for a two-photon transition (3!=6 qubits in the example shown in FIG. 7A), or N!/(k!(N−k)!) more generally for a k-photon transition.

A variety of different configurations of devices that enable control of qubits are described herein. Aside from generating the control tones, any active-matrix device needs to combine tones from different modulators and deliver them to the qubits. If the qubit transitions are optical frequency transitions, a suitable device can use optical fiber components. The output of each of N modulators is split into N−1 channels by fiber splitters 741, and all the N-choose-k combinations of these split outputs are made with fiber combiners 742. The combined control tones can be delivered to the qubits using a fiber array and imaging system. An equivalent device replaces all or some of the fiber components with photonic integrated circuit (PIC) components. Another version of a suitable device for driving two-photon transitions retains the fiber splitters but dispenses with the fiber combiners, projecting arrays of beams onto the qubits from opposite sides (e.g., using two opposed fiber arrays), so that the control tones are combined at the qubits. Yet a third version of an active-matrix device creates the arrays of beams without the fiber-optic components described earlier, by employing a holographic addressing implementation. In such a device, a spatial light modulator or phase plate is used to create an arbitrary pattern of beams, and different patterns can be created by different illumination angles. The system is configured so that overlapping beams from different combinations of modulators are imaged onto each qubit. This version of an active-matrix device is dynamically reconfigurable, so that it is not constrained to addressing qubits arranged according to any particular geometry.

Grid-Indexed Implementation

In an embodiment wherein the qubits lie on a D dimensional grid, for a two-photon transition, the qubits can be positioned at the points of a two-dimensional (2D) grid in space, with the rows and columns addressed by distinct modulators. For a three-photon transition, the qubits can be positioned at the points of a 3D grid. In either case, the grid can be a logical indexing structure instead of a real-space arrangement. Therefore, this implementation can be used for transitions driven by four or more photons, with the grid being a logical indexing structure that is mapped onto a real-space structure having three or fewer dimensions. This arrangement of modulator combinations enables control of $(N/k)^k$ qubits with N modulators driving k-photon transitions.

Figure 8A:
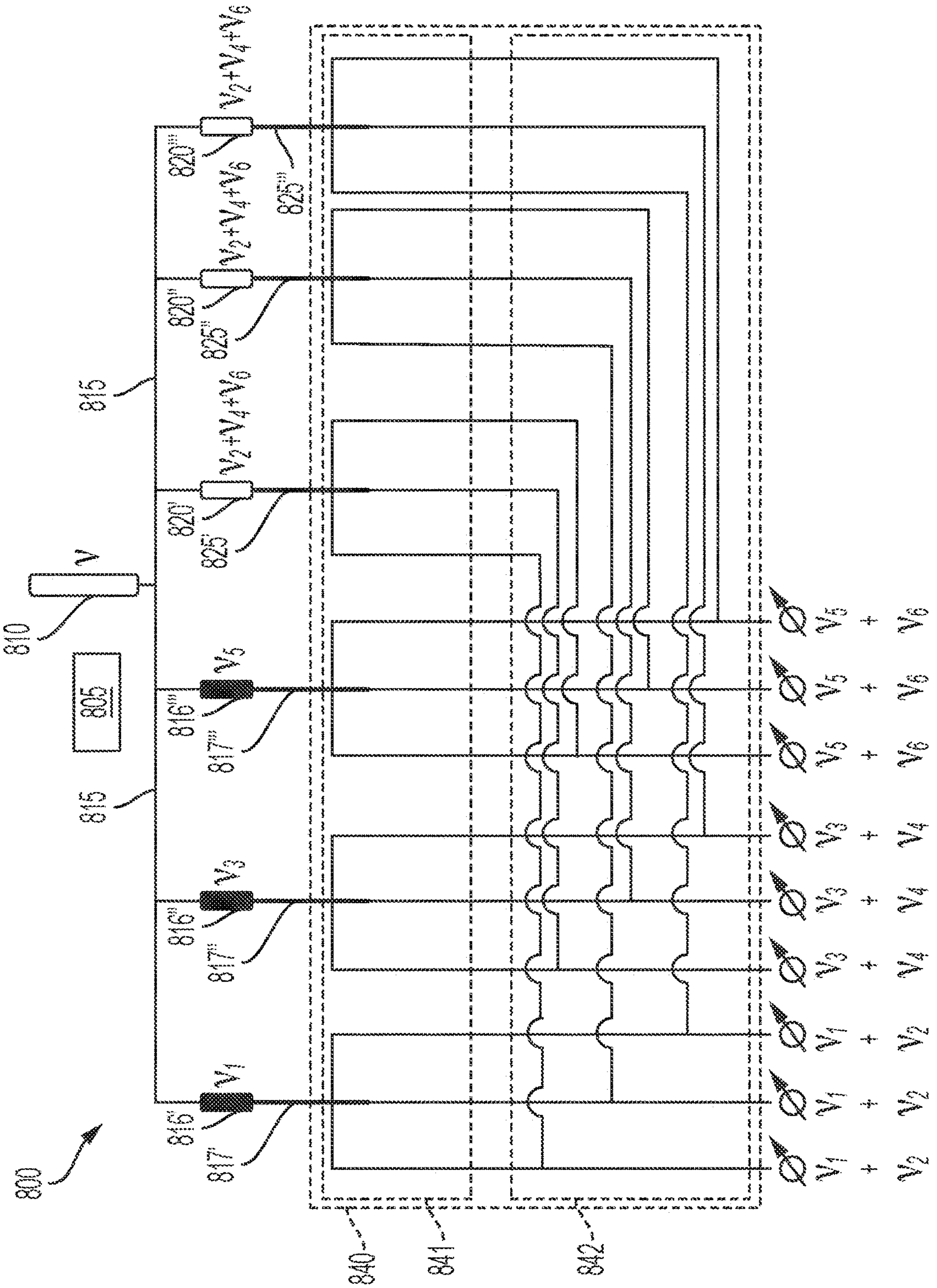
FIG. 8A schematically illustrates another active-matrix optical addressing system in accordance with one or more embodiments.
Figure 8B:
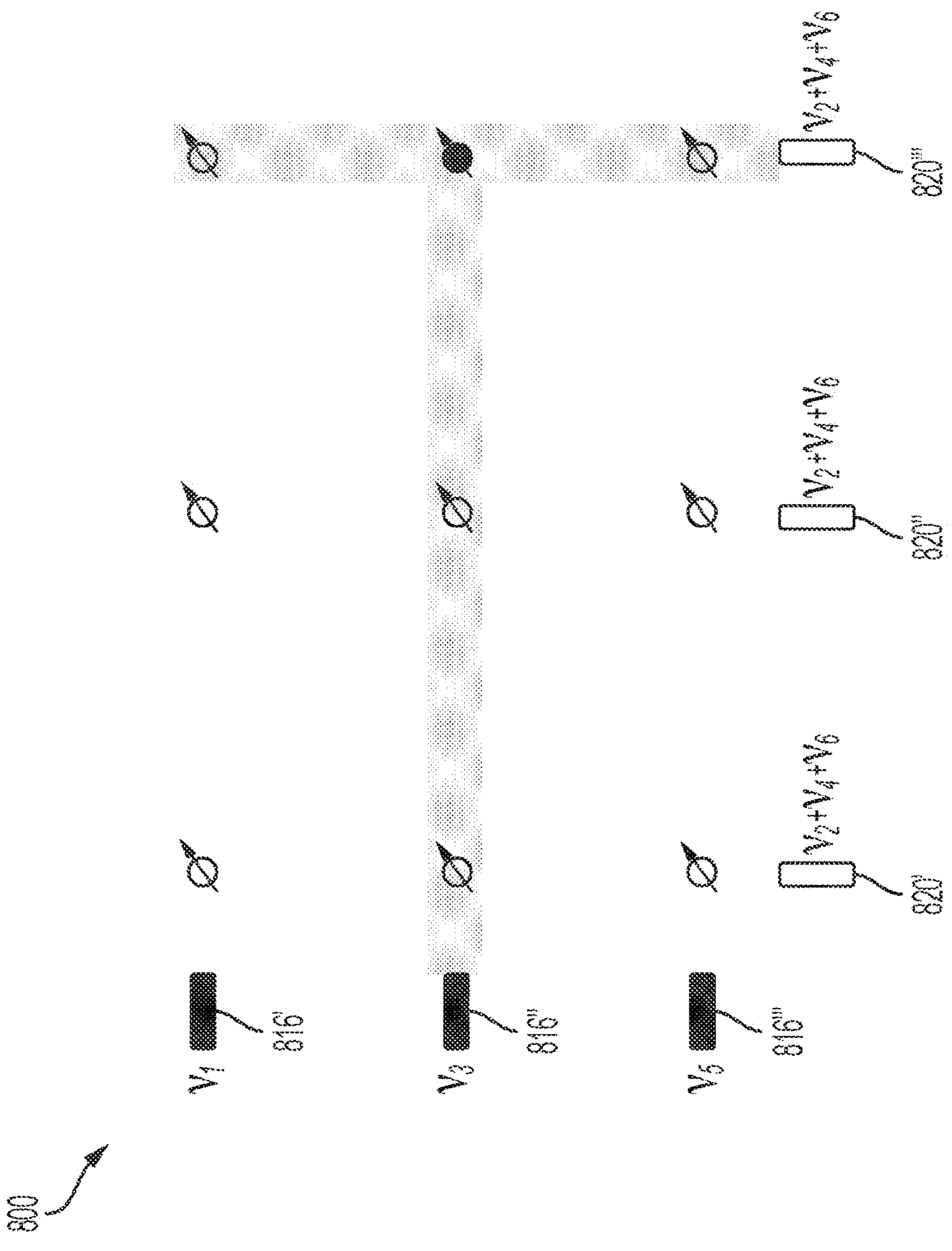
FIG. 8B schematically illustrates an active-matrix optical addressing system on a two-dimensional grid in accordance with one or more embodiments.

An optical addressing system 800 of 6 modulators (N=6) on a two-dimensional (D=2) grid of 9 qubits ($N_q$=9) driving two-photon (k=2) transitions (shown in FIG. 7B) is shown in FIGS. 8A-8B. Three selectable beams of electromagnetic radiation 825 are produced by three $$\left(N_q^{(k-1)/D} = 9^{1/2} = 3\right)$$

multi-frequency modulators 820, and three $$\left(\left[N_q^{(1/D)} \times (k-1)\right] = 9^{1/2} = 3\right)$$

single-frequency modulators that each produces a beam of electromagnetic radiation having a distinct frequency that fulfills a frequency resonance condition in combination with a single beam of the beams produced by the multi-frequency modulators 820. The combinations of modulator outputs selected by controller 805 can be made in router 840 with fiber or integrated waveguide splitters 841 and combiners 842, by holographically multiplexing control beams, or by a combination of these two approaches. If the qubit transition is an RF or microwave transition, then each qubit can be coupled to k striplines. Alternatively, if the qubit transition is an optical transition and the real-space arrangement of qubits is a grid, then the rows, columns, and sheets of the two- or three-dimensional grid can be illuminated by beams propagating along the grid dimensions. An embodiment for a two-photon transition and a two-dimensional qubit array is shown in FIG. 8B.

While the scale of the number of qubits with the number of modulators of the grid-indexed devices is not as favorable as the N-choose-k devices described above, a lower bandwidth is required of each modulator, because each modulator must produce at most N/k tones rather than N−1 tones. In addition, multi-frequency modulators 820', 820", and 820'" are needed only along one dimension of the modulator arrangement. The other dimensions can be driven by single-frequency modulators 816', 816", and 816". By employing one of the frequency-division demultiplexing devices described above, the single-frequency dimensions of the modulator arrangement can be driven by a multi-tone modulator/demux (not shown), further reducing the total number of modulators.

Tagged Implementation

Figure 9:
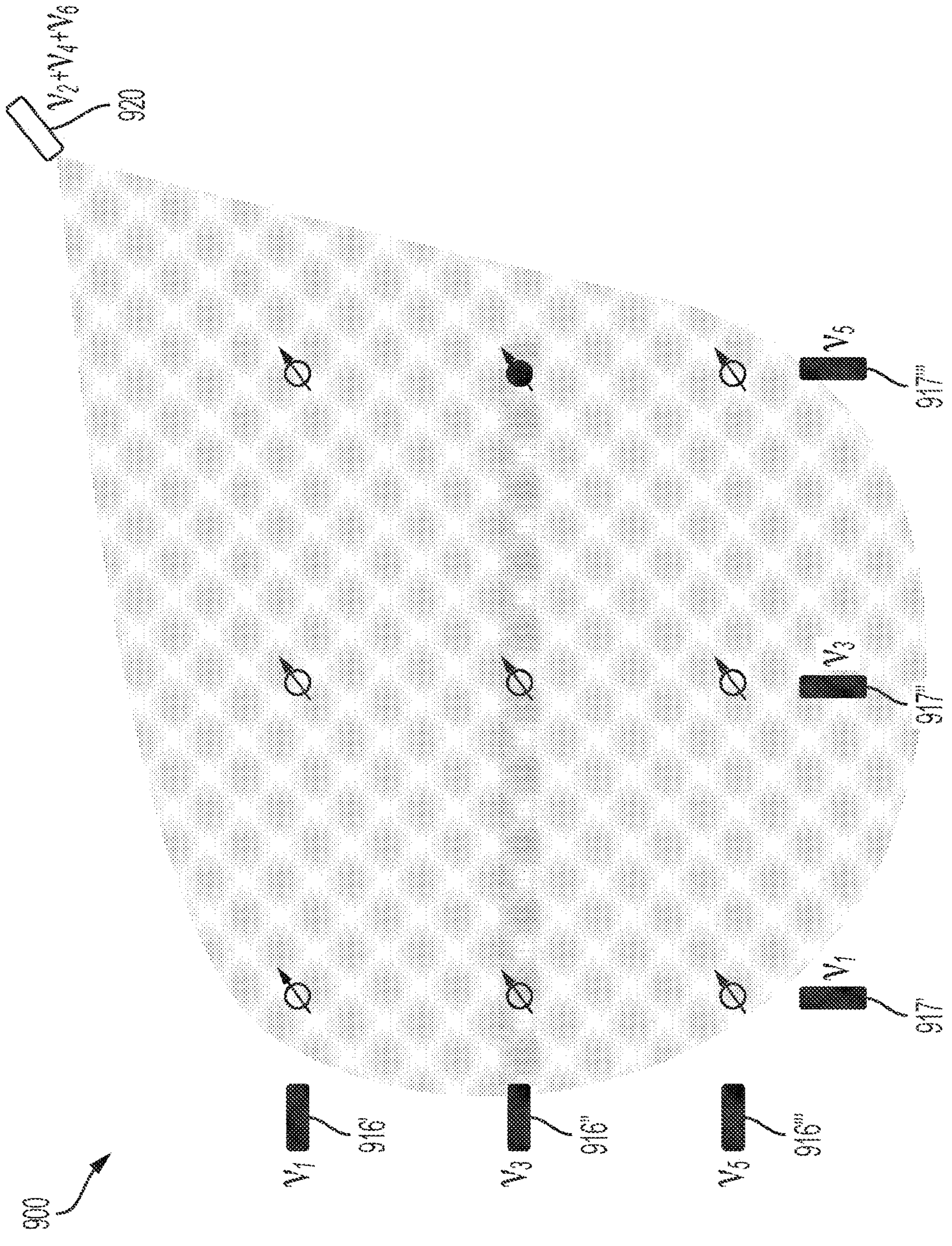
FIG. 9 schematically illustrates another active-matrix optical addressing system on a two-dimensional grid in accordance with one or more embodiments.
Figure 10A:
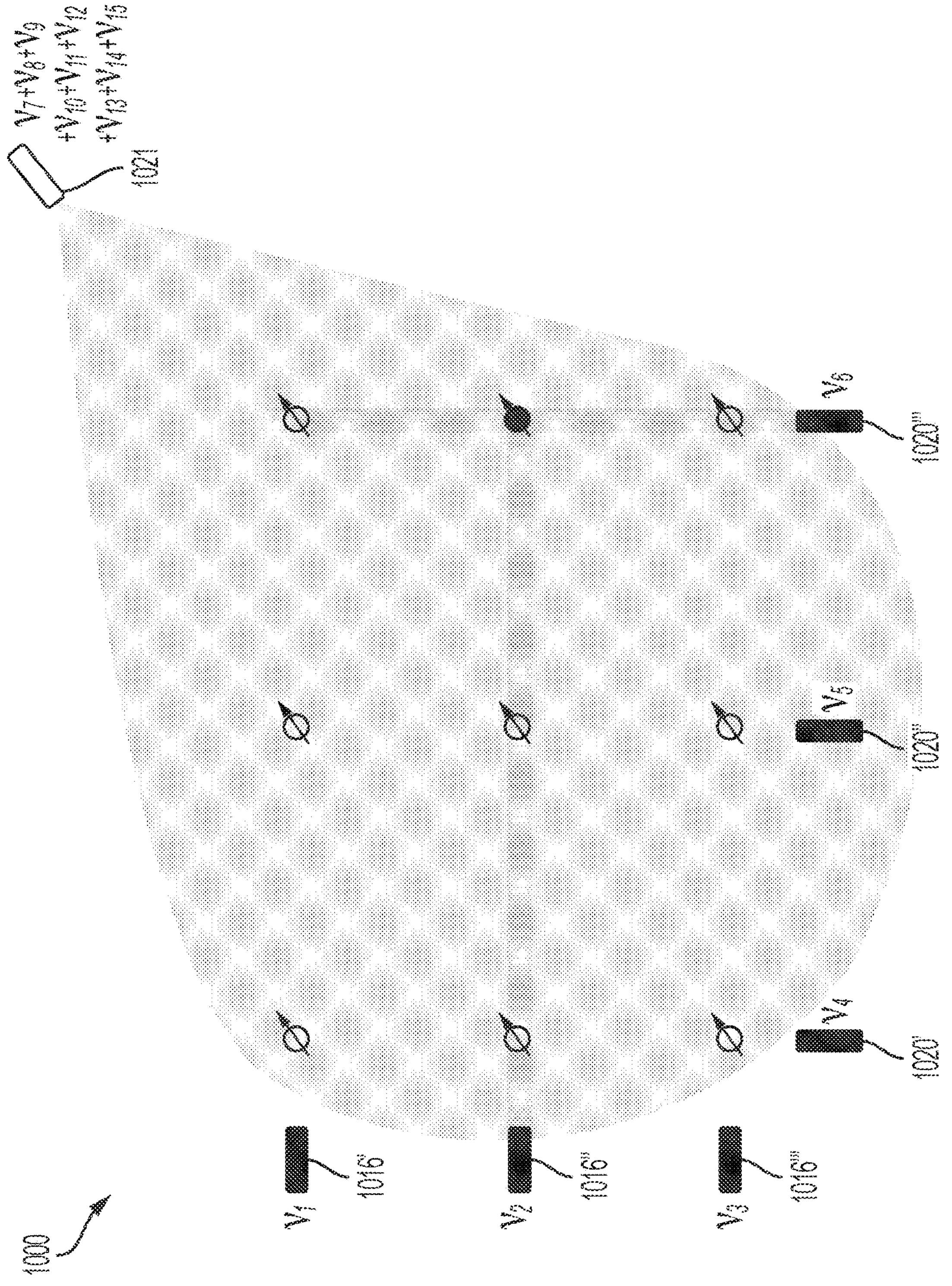
FIG. 10A schematically illustrates a three-photon active-matrix optical addressing system on a two-dimensional grid in accordance with one or more embodiments.
Figure 10B:
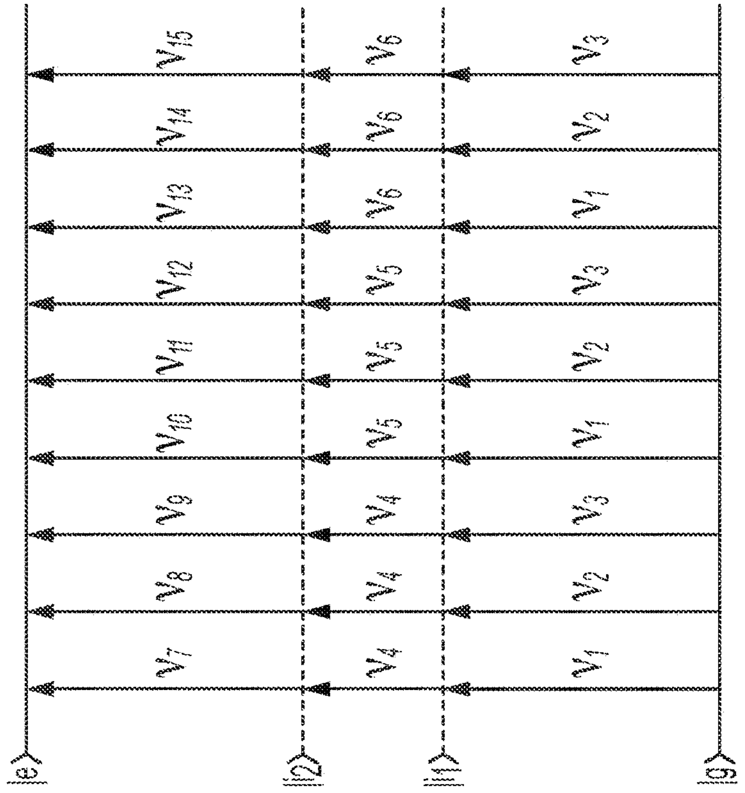
FIG. 10B schematically illustrates a three-photon level diagram in accordance with one or more embodiments.

Another embodiment of the active-matrix device involves providing k−1 of the photons needed for a k-photon transition in a static way in at least one dimension, such that each of the qubits requires a $k^{th}$ photon of a different frequency to complete its transition. Effectively, each qubit is "tagged" with a unique frequency. The qubits are also globally driven by another modulator which produces all the control tones necessary to complete each qubit transition, with one control tone corresponding to each qubit arranged on a k-dimensional grid the router being configured to selectively direct the beams of electromagnetic radiation produced by the $N_m$ modulators into $(N_m/k)^k$ unique combinations. If the qubit transition is an optical transition, then any of the devices described above can be supplemented with a modulator, delivery optics, and a beam that collectively illuminates all the qubits to enable this tagged implementation for simultaneous and independent qubit addressing using k-photon transitions for k of at least two. An embodiment for k=2, using the level scheme shown in FIG. 7B, is shown in FIG. 9 for six single-frequency modulators ($N_m$=6). Either the row single-frequency modulators 916', 916", and 916", or the column single-frequency modulators 917', 917", and 917" can be turned on statically, and turning on one modulator of the other dimension and one of the tones, $\nu_2$, $\nu_4$, or $\nu_6$ of the multi-frequency modulator 920 addresses a specific qubit. Another embodiment of the tagged active-matrix implementation with three-photon transitions between a ground state $|g\rangle$ and an excited state $|e\rangle$ and two intermediate states $|i_1\rangle$ and $|i_2\rangle$ is shown in FIGS. 10A-10B. Here, the qubits are also arranged on a grid, and the row 1016 and column 1020 modulators produce static tones so that each qubit is addressable by a unique combination of two tones (the "tags"). The three-photon transition is completed for each qubit by a unique third tone, produces by a multi-frequency modulator that addresses all the qubits. Therefore, active control of only a single multi-frequency modulator 1021 is needed for simultaneous and independent control of all the qubits.

Addressing of Nonlinear Optical Elements

In the embodiments described above, the control tones in the active-matrix implementations drive multi-photon transitions in qubits at sum or difference frequencies. In yet another embodiment, a nonlinear optical element physically generates new light waves at the sum or difference frequencies of incident light that propagate and generate single- or multi-photon transitions in qubits. An arbitrary dimensional array of such nonlinear optical devices, equal in number to the number of addressed qubits, can be seeded with input laser beams in the active-matrix implementations described above, thereby enabling a similar reduction in the number of modulators used to address a given number of qubits.

Figure 11:
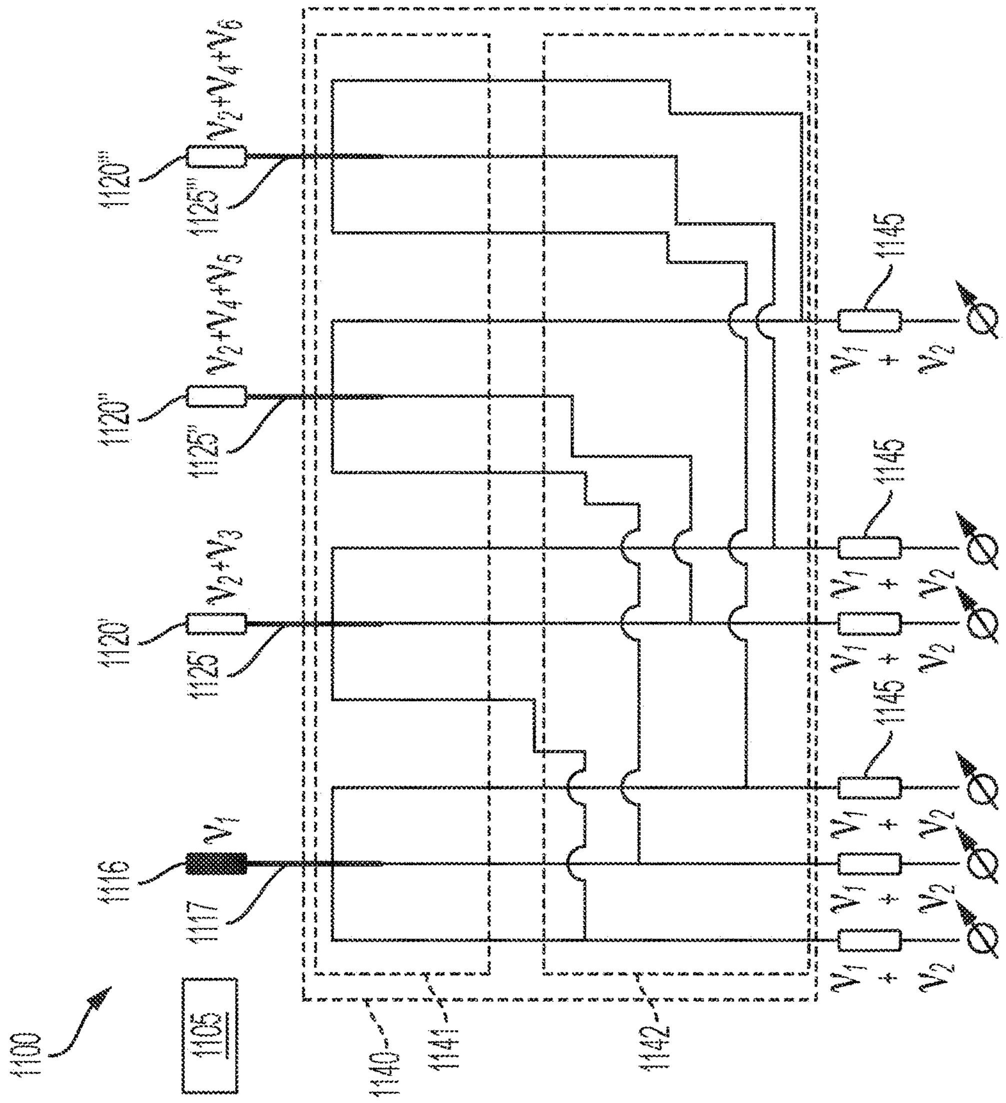
FIG. 11 schematically illustrates an optical addressing system including nonlinear optical elements in accordance with one or more embodiments.

As shown in FIG. 11, each nonlinear optical element 1145 in the array selectively generates a particular mixing product wavelength originated from combinations selected by controller 1105 of beams 1117 from single-frequency modulators 1116 and beams 1125 from multi-frequency modulators 1120, split by power splitters 1141 and combined by power combiners 1142 within router 1140. The sum- or difference-frequency generation processes can be made selectively resonant similarly to the transitions for qubits driven between energy levels using phase-matching and resonator structures built around nonlinear optical elements. Optical downconverters, upshifters, or optical parametric amplifiers and oscillators can be made by passing two or more laser beams with frequencies $\nu_i$ through an optically nonlinear material, such as lithium niobate, lithium tantalate, BBO, potassium niobate, silicon nitride, aluminum nitride or other nonlinear materials. These nonlinear materials can be periodically poled to phase-match a specific frequency-conversion process to efficiently generate a new frequency $\nu'=\Sigma_i m_i \nu_i$, where $m_i$ are positive or negative integers. For example, two laser beams with nominal wavelengths of 1560 nm can be efficiently frequency doubled using the $\chi^2$ optical nonlinearity of lithium niobate. Another example would be to use the $\chi^3$ nonlinearity of silicon nitride to generate a near third-harmonic at an optical wavelength of approximately 420 nm from three distinct laser beams at wavelengths around 1260 nm. In either or both of these examples, the nonlinear process can be made to occur inside a waveguide structure to improve optical conversion efficiency at limited optical power, and can furthermore be resonantly enhanced by a cavity-like structure. In one embodiment, the resonant structure is a waveguide ring that is lithographically defined in a silicon nitride photonic circuit.

EQUIVALENTS

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An optical addressing system comprising:

a source of electromagnetic radiation;

at least one multi-frequency modulator configured to modulate electromagnetic radiation generated by the source of electromagnetic radiation to simultaneously produce at least two beams of electromagnetic radiation having different frequencies, each of which is configured to, when applied to multi-level quantum objects, at least partially drive one or more transitions between energy levels of the multi-level quantum objects; and a router configured to selectively direct the at least two beams of electromagnetic radiation to the multi-level quantum objects, wherein the router includes a frequency division demultiplexer to separate the at least two beams of electromagnetic radiation.

2. The system of claim 1, wherein the at least one multi-frequency modulator is further configured to produce beams of electromagnetic radiation having a spectral distribution of frequencies for each of the at least two beams recited in claim 1, such that one beam has a first spectral distribution, another beam has a second spectral distribution, and the first and second spectral distributions are non-overlapping.

3. The system of claim 1, further including at least one single-frequency modulator configured to modulate electromagnetic radiation generated by the source of electromagnetic radiation to produce a beam of electromagnetic radiation having a frequency that fulfills a frequency resonance condition in combination with a single beam of the at least two beams produced by the at least one multi-frequency modulator, such that the combination drives the one or more transitions between energy levels of the multi-level quantum objects.

4. The system of claim 3, wherein the beams of electromagnetic radiation produced by the multi-frequency modulator and by the at least one single-frequency modulator are optical beams, the source of electromagnetic radiation is an optical radiation source, and the router further includes a nonlinear optical medium that combines the optical beams.

5. The system of claim 4, wherein the nonlinear optical medium is periodically-poled lithium niobate (PPLN).

6. The system of claim 3, wherein the frequency resonance condition is that a sum of the frequency of the beam of electromagnetic radiation produced by the at least one single-frequency modulator and the frequency of the single beam of the at least two beams produced by the at least one multi-frequency modulator drives the transition, and the energy levels are a ground state energy level and an excited state energy level of the multi-level quantum objects.

7. The system of claim 3, wherein the frequency resonance condition is that a difference between the frequency of the beam of electromagnetic radiation produced by the at least one single-frequency modulator and the frequency of the single beam of the at least two beams produced by the at least one multi-frequency modulator drives the transition, and the energy levels are a hyperfine energy level and another hyperfine energy level of a ground state of the multi-level quantum objects.

8. The system of claim 1, wherein the one or more transitions is a k-photon transition, with k equal to or greater than 2.

9. The system of claim 8, wherein the router is further configured to selectively direct the beams of electromagnetic radiation produced by $N_m$ modulators into $N_m$-choose-k unique combinations, such that each multi-level quantum object $N_q$ receives k beams having frequencies that fulfill a frequency resonance condition for the transition between the energy levels of the multi-level quantum objects, each of the k beams being produced by a different modulator, and $$N_m \leq k \times N_q^{1/k}.$$

10. The system of claim 9, wherein the frequency resonance condition is that a sum of the frequencies of the k beams drives the transition, and the energy levels are a ground state energy level and an excited state energy level of the multi-level quantum objects.

11. The system of claim 9, wherein the frequency resonance condition is that a difference between the frequencies of the k beams drives the transition, and the energy levels are a hyperfine energy level and another hyperfine energy level of a ground state of the multi-level quantum objects.

12. The system of claim 9, wherein the router is further configured to selectively direct the beams of electromagnetic radiation produced by the $N_m$ modulators into $(N_m/k)^k$ unique combinations, and the multi-level quantum objects are arranged on a k-dimensional grid.

13. The system of claim 8, wherein $N_q$ multi-level quantum objects are arranged on a D dimensional grid, the router is further configured to selectively direct $$N_q^{(k-1)/D}$$

selectable beams or electromagnetic radiation produced by the at least one multi-frequency modulator to the $N_q$ multi-level quantum objects, and the system further includes $$\left[N_q^{(1/D)} \times (k-1)\right]$$

single-frequency modulators that each produces a beam of electromagnetic radiation having a distinct frequency that fulfills a frequency resonance condition in combination with a single beam of the at least two beams produced by the at least one multi-frequency modulator.

14. The system of claim 3, wherein the router is further configured to combine the beams in free space.

15. The system of claim 3, wherein the beams of electromagnetic radiation are combined at the multi-level quantum objects.

16. The system of claim 3, wherein the router includes at least one waveguide arranged to combine the at least two beams of electromagnetic radiation.

17. The system of claim 3, wherein the router includes at least one photonic integrated circuit (PIC) arranged to combine the at least two beams of electromagnetic radiation.

18. The system of claim 3, wherein the router includes a holographic addressing system.

19. The system of claim 18, wherein the holographic addressing system is a spatial light modulator (SLM).

20. The system of claim 18, wherein the holographic addressing system is a phase plate.

* * * * *